(12) United States Patent
Morris

(10) Patent No.: US 9,459,123 B1
(45) Date of Patent: Oct. 4, 2016

(54) VIBRATION PROBE PROTECTION BRACKET APPARATUS AND METHOD OF USE THEREOF

(71) Applicant: Roger Morris, Henderson, TX (US)

(72) Inventor: Roger Morris, Henderson, TX (US)

(*) Notice: Subject to any disclaimer, the term of this patent is extended or adjusted under 35 U.S.C. 154(b) by 0 days.

(21) Appl. No.: 14/794,692

(22) Filed: Jul. 8, 2015

(51) Int. Cl.
*G01D 11/24* (2006.01)
*G01D 11/30* (2006.01)
*G01H 17/00* (2006.01)

(52) U.S. Cl.
CPC ............ *G01D 11/24* (2013.01); *G01D 11/30* (2013.01); *G01H 17/00* (2013.01)

(58) Field of Classification Search
CPC ............................. G01D 11/24; G01D 11/245
USPC .......................................................... 73/431
See application file for complete search history.

(56) References Cited

U.S. PATENT DOCUMENTS

| 3,002,374 | A * | 10/1961 | Jacobs ............... | F01D 21/06 415/118 |
| 2006/0236732 | A1 * | 10/2006 | Hoffman ............. | E05C 3/042 70/127 |
| 2008/0156278 | A1 * | 7/2008 | Mainini .............. | A01K 27/009 119/718 |
| 2014/0158497 | A1 * | 6/2014 | Bogle ................ | B65G 15/42 198/341.07 |

FOREIGN PATENT DOCUMENTS

CN    203323861 U  * 12/2013

* cited by examiner

*Primary Examiner* — Michael A Lyons
*Assistant Examiner* — Jamel Williams
(74) *Attorney, Agent, or Firm* — Kevin Hazen

(57) ABSTRACT

The invention comprises a vibration probe protection apparatus and method of use thereof. The sensor protection system dynamically moves the probe away from the shaft in response to radial movement of the shaft and subsequently repositions the sensor probe at a set distance from the rotating shaft. The sensor protection system optionally: (1) positions a protective element closer to the shaft than a tip of the probe, where radial movement of the shaft strikes the protective element and the protective element uses a portion of the resulting striking force to move the probe away from the shaft; (2) resists bounce of the probe upon delivery of force from movement of the shaft to the protective element; and/or (3) provides a return spring force to the probe tip toward the shaft to reposition the probe against a hard stop.

20 Claims, 3 Drawing Sheets

VIBRATION PROBE PROTECTION BRACKET APPARATUS AND METHOD OF USE THEREOF

BACKGROUND OF THE INVENTION

1. Field of the Invention

The invention relates to a vibration probe protection system.

2. Discussion of the Prior Art

Industrial devices, such as a generator or turbine, using a rotating shaft positioned on a bearing or bearing support structure require maintenance. Currently, regular timed maintenance procedures are implemented that require shutdown of the industrial device without knowledge of the actual health of the industrial device.

Problem

Delicate probes placed near the high mass rotating shaft are damaged by small shaft vibrations that result in striking the high mass shaft against the delicate probes. What is needed is a protected noninvasive vibration sensor/probe for determining health of one or more elements of the industrial device.

SUMMARY OF THE INVENTION

The invention comprises a vibration probe protection system.

DESCRIPTION OF THE FIGURES

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises a vibration probe protection bracket apparatus and method of use thereof.

In one embodiment a sensor protection system uses at least a mechanical element to perform a task of at least one of: (1) preventing an x/y-plane movement of a shaft rotating about a z-axis from striking a probe, such as via dynamic movement of the probe away from the shaft upon vibration of the shaft; (2) positioning a protective element closer to an outer x/y-plane circumference of the shaft than a tip of the probe; (3) resisting bounce of the probe/sample probe upon delivery of force from an x/y-plane movement of the shaft to the protective element; and (4) providing a return force to the probe tip toward the outer x/y-plane circumference of the shaft, the return force limited by a hard stop.

Probe

Figure 1A:
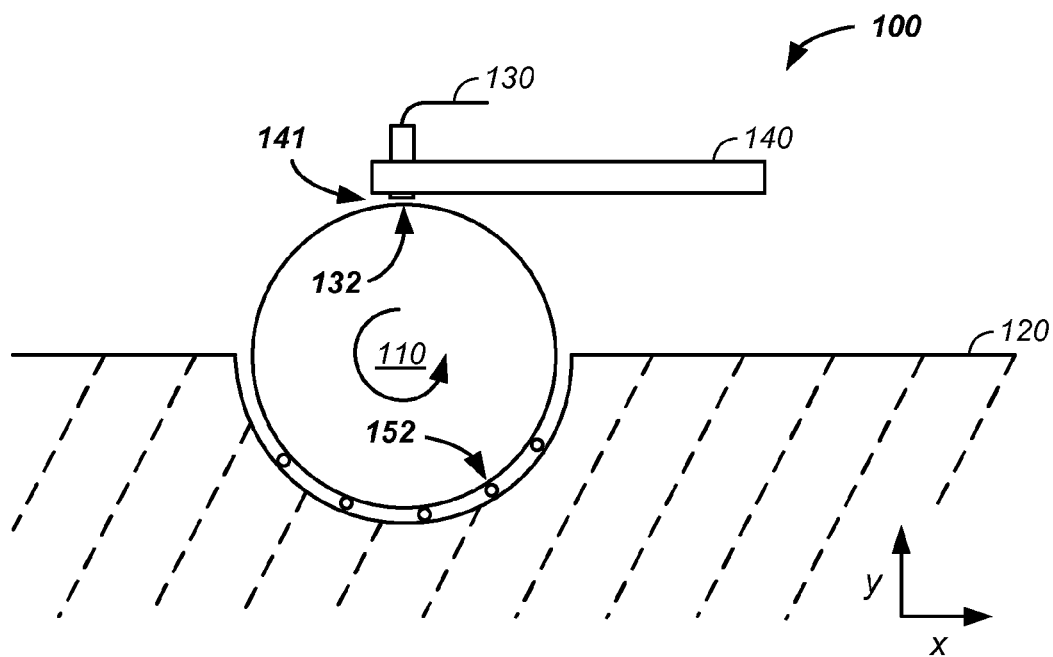
FIG. 1A and FIG. 1B respectively illustrate a rotating shaft: (1) in close proximity to a sensor element and (2) in physical contact with a sensor element.

Referring now to FIG. 1A, an industrial device 100 is illustrated, where the industrial device 100 comprises: a shaft 110 and a bearing structure 120, which is known in the field as a bearing. Generally, the shaft 110 comprises any rotatable longitudinal element, such as a solid bar or tube, having a circular cross-section. In use, the shaft 110 rotates about a longitudinal axis of the shaft 110 and is held in place using at least the bearing structure 120 and gravity. Examples of the bearing structure 120 include: a bearing metal, an alloy, a Babbitt metal, and a Babbitt bearing. As illustrated, the shaft 110 rotates about a z-axis, where the z-axis is normal to a cross-sectional x/y-plane of the shaft 110. Optionally and preferably, a thin film of lubricant 152 separates the shaft 110 from the bearing structure 120, as described infra.

Still referring to FIG. 1A, in many applications a sensor 130, such as a vibration sensor, is held in position with a support structure 140 or bracket and is positioned proximate the shaft 110. The sensor 130 is optionally any sensing element, such as an electromechanical and/or electrochemical sensor. For clarity of presentation and without loss of generality, a vibration sensor is used to illustrate the sensor 130. In some applications, the sensor 130 has a sensor probe head 132 positioned with a first gap distance 141 between the sensor probe head 132 and an outer circumference of the shaft 110. Optionally and preferably, the first gap distance is more than 0.0005 or 0.001 of an inch and less than about 0.002, 0.003, 0.004, 0.005, 0.010, and/or 0.020 of an inch.

Example I

Still referring to FIG. 1A, in a first example, for clarity of presentation and without loss of generality, an exemplary first gap distance 141 of 0.003±0.0005 inch or 0.003±0.002 inch is used herein to describe the invention. When the shaft 110—support bearing 120 combination is operating within specification, the shaft 110 optionally rides on a thin film of lubricant 152, such as an oil. During operation, the thin film of lubricant 152 aids in maintenance of the first gap distance 141.

Figure 1B:
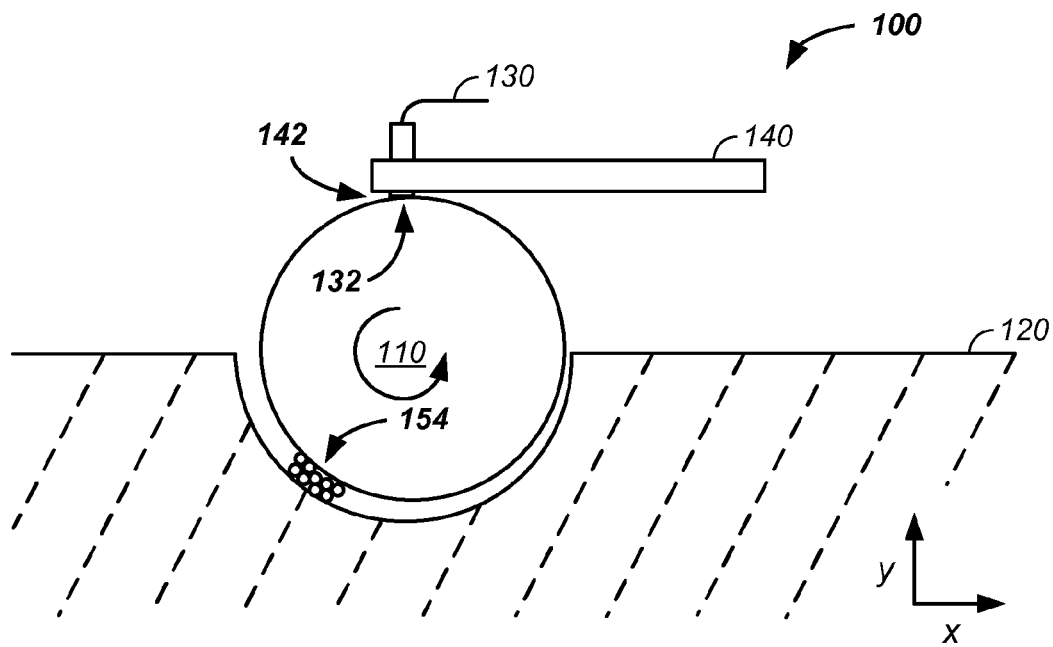

Still referring to FIG. 1A and referring now to FIG. 1B, at times the first gap distance 141 is reduced to a second gap distance 142 or contact distance of about zero millimeters and/or to a distance causing the outer circumference of the shaft 110 or a constituent riding thereon, such as a lubricant or debris, to strike the sensor probe head 132. As the sensor probe head 132 has low mass and the shaft 110 is of high mass, upon contact significant energy is transferred from the shaft 110 to the sensor probe head 132, which often leads to destruction and/or a need for recalibration of the sample probe 130 and/or destruction of the sample probe 130. Indeed, the high mass of at least 5, 10, 50, or 100 kilograms of the shaft 110 and the low mass of the sample probe 130, such as less than 1.0, 0.5, 0.25, or 0.1 kilograms, typically results in destruction of even a rugged sensor design. Further, typically the sensor 130 is fragile and/or has a delicate component, such as a polished surface, an electrical connection, a narrow mechano-optical separation specification, a chemically treated surface, a glass element, a fiberglass element, a wire, a hair wire, a transducing element, and/or a sensor element surface. Hence, even slight contact of the high mass rotating shaft 110 with the sensor 130 results in unacceptable performance of the sensor 130, a need for recalibration of the sensor 130, and/or destruction of the sensor 130.

Example II

Still referring to FIG. 1A and FIG. 1B, a second non-limiting example is illustrated for clarity of presentation. In this second example, the lubricant is illustrated as having formed a wedge 154, such as an oil wedge. The wedge 154 is illustrative of any mechanical debris moving the shaft 110. As illustrated, the wedge 154 aids in creation of a slight shift in the x/y-plane of the shaft 110 resulting in the outer circumference of the shaft 110 or a substance carried thereon reducing the first gap distance 141 to the second gap distance 142 causing the above described damage to or destruction of the sample probe head 132 and/or destruction of the sample probe 130.

Still referring to FIG. 1B, example II provided only a single example of the lubricant as a source of movement of the shaft 110 in the x/y-plane. However, movement of the shaft 110 in the x/y-plane with the same detrimental result on the sensor probe 130 may result from a variety of sources, such as (1) vibration upon start-up and/or shut-down of the industrial device 100; (2) vibration upon start-up and/or shut down of rotation of the shaft 110; (3) at a rotation rate of the shaft 110 that is a harmonic of a natural frequency of the material of the shaft 110; and/or (4) upon a shock and/or vibration to the larger industrial device 100.

Protected Sensor

Figure 2A:
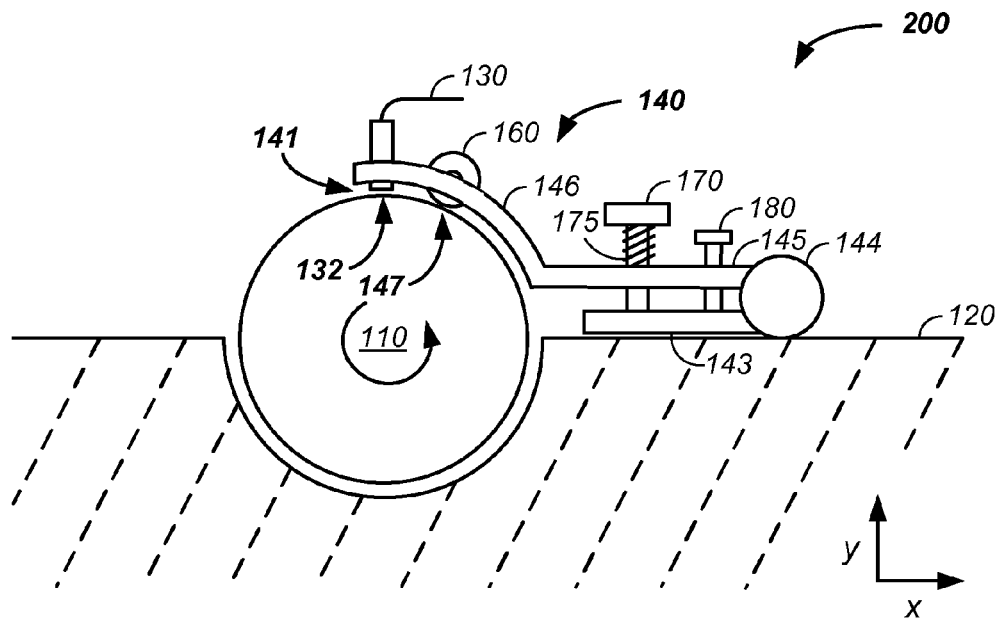
FIG. 2A and FIG. 2B illustrate a dynamically positioned sensing system from an edge and perspective view, respectively.
Figure 2B:
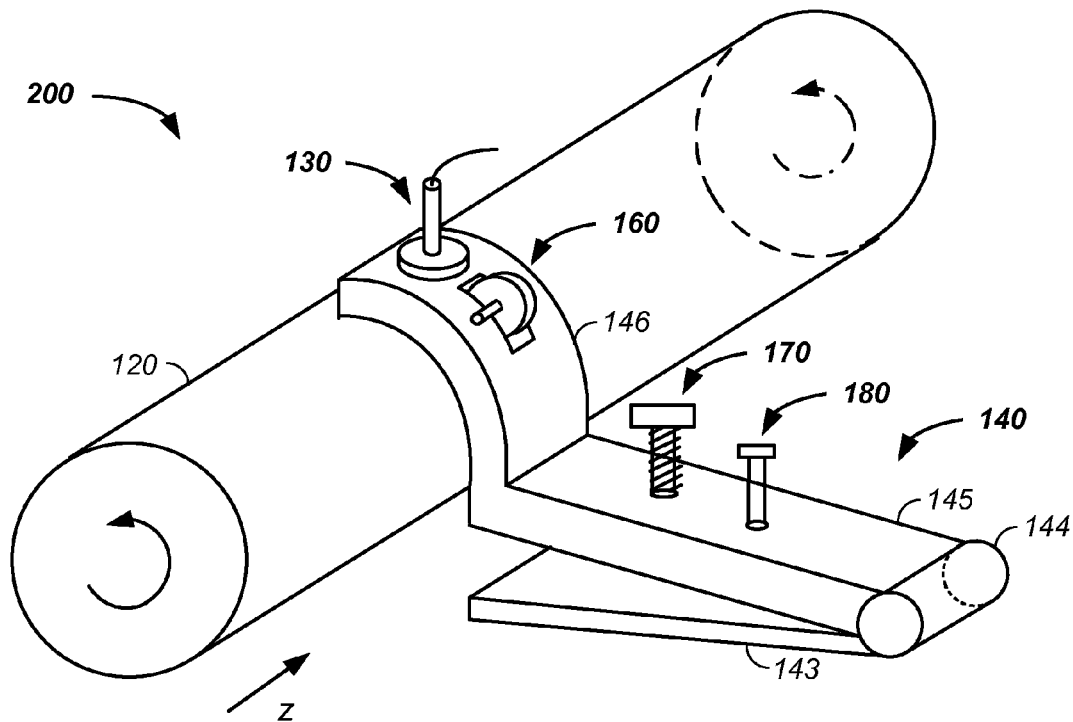

Referring now to FIG. 2A and FIG. 2B, a sensor protection system 200 is described. Generally, the sensor protection system 200 maintains a minimum distance for the first gap distance 141 between the sensor probe tip 132 and the outer x/y-plane circumference of the shaft 110. For clarity of presentation and without loss of generality, the sensor protection system 200 is illustrated with a mount element, a sensor protecting element, a shock system, and a sensor positioning system. However, the examples provided herein are merely representative of an element or combinations of elements used to achieve protection of the probe 130.

Example I

Mount Element

Still referring to FIG. 2A and FIG. 2B, a first non-limiting example of the sensor protection system 200 is illustrated for clarity of presentation. In this example, the support structure 140 or mount element is described, where the support structure 140 comprises at least one flexible element, which flexes in response to small spring forces transferred by an intermediate element from the shaft 110, such as a force of less than 0.5, 1, 2, 5, or 10 Newtons and/or a force applicable by an index finger. As illustrated, the support structure 140 includes: a mounting support element 143, a pivoting support element 144, a spring support element 145, and a positioner support element 146. Combined, the elements of the support structure 140 form a mountable element that moves: (1) away from the shaft upon receipt of energy and/or force transferred from the shaft 110 and (2) with a return spring force that moves the supported sensor 130 toward the shaft 110, such as toward a center of the shaft 110. As illustrated, the mounting support element 143 mounts to the bearing structure 120, which allows any shock movement to the bearing structure 120 to form a corresponding movement of the sensor probe 130 via the support structure 140. However, more generally, the mounting support element 143 is optionally mounted to any rigid surface, such as a wall, a wall element, a floor, a base element, and/or an element of the industrial device 100. As illustrated the pivot support element 144 connects to both the base support element 143 and the spring support element 145 to form a spring structure yielding the return spring force. The spring support element 145 is optionally one piece and is illustrated herein with a straight section and a curved section that is integrated with or connected to the positioner support element 146. The particular combination of the mounting support element 143, the pivoting support element 144, the spring support element 145, and the positioner support element 146 function in cooperation with a protection element 160, a shock element 170, and/or a set element 180, described infra.

However, more generally, the support structure 140 is any mechanical mount that deforms or moves in response to energy translated from the shaft, has a return force to move the sensor 130 back into an alignment position, and functions to hold one or more additional elements of the sensor protection system, such as the protection element 160, the shock element 170, and the set element 180. Optionally, a flexible portion of the support structure that bends away from the shaft 110 upon the shaft 110 striking the protection element 160 comprises at least one plastic portion and/or has a thickness of less than 1, 05, 0.25, or 0.1 inch.

Protection Element

Still referring to FIG. 2A and FIG. 2B, for clarity of presentation and without limitation, an example of the protection element 160 is illustrated. Generally, the protection element 160 includes at least one portion mounted with a third gap distance 147 between the protection element 160 and the outer circumference along the x/y-plane of the shaft 110, where at an aligned position the third gap distance 147 is greater than zero and less than the first gap distance 142 between the probe tip 132 and the outer circumference along the x/y-plane of the shaft 110. Additionally, the protection element is connected, such as via an intermediate mechanical element to the probe 130 and/or positioner support element 146 that positions the probe 130 relative to the shaft 110. As a unit, the protection element 160, when struck by the shaft 110, moves the probe 130 and probe tip 132 away from the shaft 110 so that vibration and/or movement of the shaft 110 does not deliver energy directly to the probe 130 and does not deliver damaging and/or destructive energy to the probe 130. The protection element 160 is optionally and preferably connected to the support structure 140 in a manner that the flexible element(s) of the support structure 140 flex or bend in response to a force transferred via the protection element 160 from the x/y-plane translating shaft 110 in a manner that moves the probe tip 132 away from the x/y-plane translating shaft 110. Optionally, the protection element 160 comprises a mounted bearing or mounted roller bearing that rotates in response to contact by the rotating shaft to prevent a, potentially destructive, catching or dragging force applied by the shaft 110 to the protection element 160. Optionally, the protection element 160 is substantially non-magnetic and/or non-magnetic to avoid an inductive force being established between the rotating shaft 110 and the protective element 160. Generally, when the shaft 110 bumps the protective element 160, the protective element potentially bounces away from the shaft 110. To prevent undue bounce, the sensor protection system 200 optionally includes a shock element 170, described infra.

Shock Element

Still referring to FIG. 2A and FIG. 2B, for clarity of presentation and without limitation, an example of the shock element 170 is illustrated. Generally, the shock element 170 includes at least one force damping element. As illustrated, the shock element 170 includes a spring 175. The spring 175 is mounted and/or positioned on a first end relative to any element of the support structure that moves in response to force transferred via the protection element 160 from movement of the shaft 110 in the x/y-plane. The spring 175 is mounted and/or positioned on a second end relative to a resistive element, such as a rigidly affixed mass and/or a mass that moves with movement of the spring support element 145. In this example, the shock element 170 includes a shock bolt 170 or bolt bolted to the spring support element 145 with the spring 175 positioned around the bolt 170 so that the spring support element 145 moves toward a head of the shock bolt 170 against the damping resistance of the spring 175 in response to x/y-plane movement of the shaft 110 transferred to the protection element 160.

Set Element

Still referring to FIG. 2A and FIG. 2B, for clarity of presentation and without limitation, an example of the set element 180 is illustrated. Generally, the set element 180 includes a means for setting the third gap distance 147 between the x/y-plane outer circumference of the shaft 110 and the protection element 160. In this example, the set element 180 is a set bolt threaded through the spring support element 145 that extends to the bearing support 120 or to the mounting support element 143 and is adjustable via turning of the set bolt. Adjustment of protrusion of a set bolt distance through the spring support element adjusts the third gap distance 147 to be greater than zero and less than the first gap distance 141, as described supra. Similarly, the shock bolt 170 of the shock element 170 optionally protrudes through the spring support element 145 to the bearing support 120 or to the mounting support element 143 and is adjustable via turning of the shock bolt 170 to set the third gap distance 147. The shock bolt 170 and/or the set bolt provide a hard stop to limit extension/expansion of the spring 175 of the shock element 170 providing a force pushing the probe 130 toward the shaft 110.

Generally, the sensor protection system 200 uses at least a mechanical element to perform the task of any of:

preventing an x/y-plane movement of the shaft 110 from striking the probe tip 132;

positioning the protective element 160 closer to the shaft 110 than the probe tip 132;

resisting bounce of the sample probe 130 upon delivery of force from an x/y-plane movement of the shaft 110 to the protective element 160; and providing a return force to the probe tip 132 toward the outer x/y-plane circumference of the shaft 110, the return force limited by a hard stop.

Physical Interface

Figure 3:
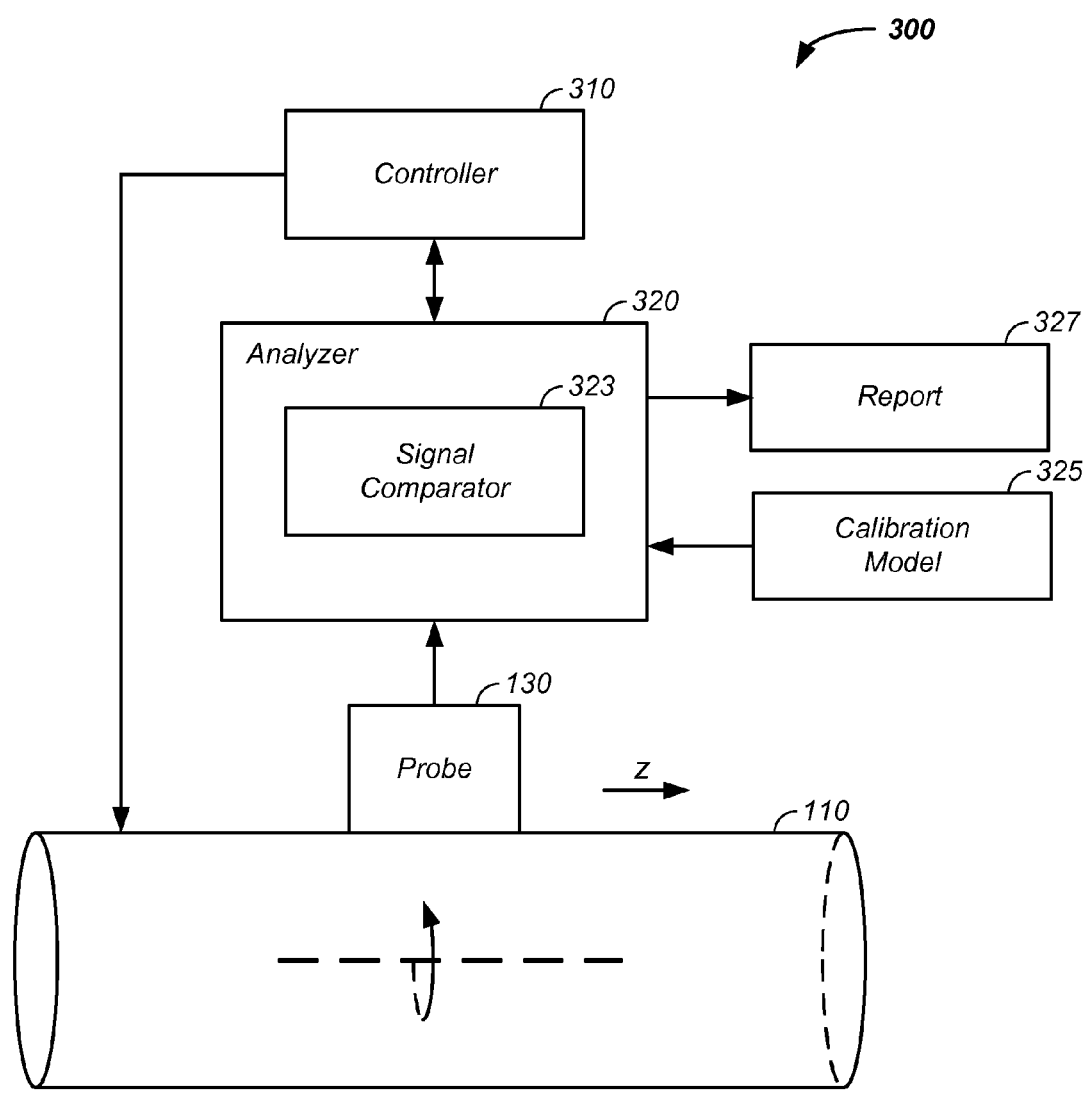
FIG. 3 illustrates a method of use of the probe protection system.

Referring now to FIG. 3, a method of use 300 of the probe 130 is illustrated. Generally, in one case the sensor protection system 200 optionally functions without any user input and/or interfaces to a human user. In a second case, the sensor protection system 200 interfaces with a user, such as via computer related hardware, such as to yield data on frequency of x/y-plane movement of the shaft 110. In the second case, an output signal from the probe 130 is provided to a controller 310 and/or is provided to an analyzer 320 controlled by the controller 310. The analyzer 320 is additionally provided with previous data, such as in the form of a calibration model 325. The analyzer 320 compares the output signal to calibration data and/or applies the calibration model to the output signal to generate a value, which is optionally used in a generated report 327 and/or is used by the controller 310 in control of at least one element of the industrial device 100, such as control of movement of the shaft 110.

Computer

The sensor protection system 200 is optionally interface to one or more computers using physical interface connections, such as a wireless receiver or a physical connection. The client/computer optionally includes a computer-readable storage medium, such as memory. The memory includes, but is not limited to, an electronic, optical, magnetic, or another storage or transmission data storage medium capable of coupling to a processor, such as a processor in communication with a touch-sensitive input device linked to computer-readable instructions. Other examples of suitable media include, for example, a flash drive, a CD-ROM, read only memory (ROM), random access memory (RAM), an application-specific integrated circuit (ASIC), a DVD, magnetic disk, an optical disk, and/or a memory chip. The processor executes a set of computer-executable program code instructions stored in the memory. The instructions may comprise code from any computer-programming language, including, for example, C originally of Bell Laboratories, C++, C#, Visual Basic® (Microsoft, Redmond, Wash.), Matlab® (MathWorks, Natick, Mass.), Java® (Oracle Corporation, Redwood City, Calif.), and JavaScript® (Oracle Corporation, Redwood City, Calif.).

SUMMARY

Generally, the sensor protection system: (1) dynamically moves, without needed computer or human interaction, the probe away from the shaft in response to radial movement of the shaft and (2) through use of a return force, such as in a spring energy resulting from deformation/bending of at least one portion of the mounting bracket and/or via a return force spring, repositions the sensor probe at a set distance from the rotating shaft.

Still yet another embodiment includes any combination and/or permutation of any of the elements described herein.

Herein, a set of fixed numbers, such as 1, 2, 3, 4, 5, 10, or 20 optionally means at least any number in the set of fixed number and/or less than any number in the set of fixed numbers.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. An apparatus for protecting a probe, during use the apparatus configured proximate a shaft rotatable about a z-axis, the shaft positioned on a support bearing, said apparatus comprising:
   a mount element configured to mount to a rigid surface, said mount element comprising:
      a probe positioning support element configured to position a tip of the probe at a first distance of at least 0.0005 inch and less than 0.02 inch from an outer x/y-plane circumference of the shaft;
      a probe protection element positioned at a second distance greater than zero inches and less than the first distance from the outer x/y-plane circumference of the shaft; and
      a deformable element connected to both said probe protection element and said probe positioning support element,
      wherein upon movement of the shaft in the x/y-plane sufficient to strike said probe protection element, energy from the shaft is transferred through the probe protection element to said deformable element resulting in movement of said deformable element and said probe positioning support element away from the shaft.

2. The apparatus of claim 1, said mount element affixed to the support bearing.

3. The apparatus of claim 1, wherein said protection element further comprises:
   a roller bearing comprising a rolling surface, said rolling surface positioned at the second distance from the shaft during use.

4. The apparatus of claim 1, said deformable element further comprising:
   at least one plastic portion, said plastic portion less than one quarter of an inch thick, wherein said plastic portion bends in response to the energy transferred from the shaft.

5. The apparatus of claim 4, further comprising:
   a shock absorbing element attached to said mount element, said shock absorbing element configured to dampen movement of the probe positioning support element upon contact of the shaft with the probe protection element.

6. The apparatus of claim 5, said shock absorbing element further comprising:
   a spring attached to said mount element.

7. The apparatus of claim 6, further comprising:
   a set element, said set element comprising a bolt, said spring circumferentially positioned about a longitudinal axis of said bolt, said bolt comprising an end extending through said mount element, a distance of the extension of said end of said bolt through said mount element configured to provide a hard stop to establish the first distance between the tip of the probe and the outer circumference of the shaft.

8. The apparatus of claim 5, said mount element configured with a first arm and a second arm each attached to a pivot to form at least a portion of said shock absorbing element.

9. The apparatus of claim 5, further comprising:
   a set element connected to said mount element, said set element configured to set the first distance.

10. A method for protecting a sensor, the method used proximate a shaft rotatable about a z-axis, the shaft positioned on a support bearing, said method comprising the steps of:
   mounting a mount element to a rigid surface, said mount element comprising a sensor positioning support element, a sensor protection element, and a flexible element;
   positioning a tip of the sensor, with the sensor positioning support element, at a first distance of at least 0.0005 inch and less than 0.1 inch from an outer x/y-plane circumference of the shaft;
   positioning the sensor protection element at a second distance greater than zero inches and less than the first distance from the outer x/y-plane circumference of the shaft;
   connecting a flexible element to both said sensor protection element and said sensor positioning support element; and
   upon movement of the shaft in the x/y-plane sufficient to strike said sensor protection element, transferring energy from the shaft through the sensor protection element to said flexible element resulting in movement of at least a portion of said flexible element and said sensor positioning support element away from the shaft.

11. The method of claim 10, further comprising the step of:
   a rolling surface of a bearing of said protection element rolling upon contact by the shaft.

12. The method of claim 10, further comprising the steps of:
   a portion of said flexible element bending away from said shaft upon receipt of the transferred energy; and
   said portion of said flexible element subsequently returning to an original shape of the flexible element after the transferred energy dissipates.

13. The method of claim 12, further comprising the step of:
   a shock absorbing element, attached to said sensor protection element, damping a change of the first distance upon contact of the shaft with the sensor protection element by absorbing at least a portion of the transferred energy.

14. The method of claim 12, further comprising the step of:
   a shock absorbing element, attached to said sensor protection element and said flexible element, providing a return force to said flexible element to aid in reforming the original shape of the flexible element.

15. The method of claim 14, further comprising the step of:
   using a spring attached to said mount element to absorb at least a portion of the transferred energy.

16. The method of claim 10, further comprising the step of:
   deforming said mount element to absorb at least a portion of the transferred energy.

17. The method of claim 10, further comprising the step of:
   said mount element moving said sensor away from a center of the shaft upon vibration of said shaft.

18. The method of claim 10, said sensor comprising a vibration probe, said mounting bearing comprising a Babbitt metal, and said shaft comprising an element of at least one of a generator and a turbine.

19. A method for protecting a vibration sensor from x/y-plane movement of a shaft rotatable about a z-axis, the shaft positioned on a support bearing, said method comprising the steps of:
   mounting a mount element to a rigid surface, said mount element comprising a sensor positioning element, a sensor protection element, and a flexible element used to connect said sensor protection element to said sensor positioning element;
   positioning said sensor protection element closer to the shaft than a tip of the vibration sensor; and
   using said flexible element to move said sensor positioning element and the vibration sensor away from the shaft upon vibration of the shaft resulting in contact between the shaft and the sensor protection element.

20. The method of claim 19, further comprising the step of:
   using a return force to move said flexible element to an original set position, said set position using a hard stop to counter said return force upon reaching the original set position.

* * * * *